United States Patent
Zeng et al.

(10) Patent No.: US 7,199,912 B2
(45) Date of Patent: Apr. 3, 2007

(54) FOURIER TRANSFORM LENS SYSTEM AND HOLOGRAPHIC STORAGE SYSTEM USING SAME

(75) Inventors: Ji-Yong Zeng, Beijing (CN); Guo-Fan Jin, Beijing (CN); Min-Qiang Wang, Beijing (CN); Ying-Bai Yan, Beijing (CN)

(73) Assignees: Hon Hai Precision Industry Co. Ltd, Taipei Hsien (TW); Tsinghua University, Beijing (CN)

( * ) Notice: Subject to any disclaimer, the term of this patent is extended or adjusted under 35 U.S.C. 154(b) by 0 days.

(21) Appl. No.: 11/432,423

(22) Filed: May 10, 2006

(65) Prior Publication Data

US 2006/0256416 A1   Nov. 16, 2006

(30) Foreign Application Priority Data

May 13, 2005   (CN) .......................... 2005 1 0034649

(51) Int. Cl.
*G03H 1/16*   (2006.01)
(52) U.S. Cl. .............................. 359/29; 359/35; 359/32; 359/761; 359/784
(58) Field of Classification Search .................. 359/29
See application file for complete search history.

(56) References Cited

U.S. PATENT DOCUMENTS

| | | | | |
|---|---|---|---|---|
| 4,189,214 A | * | 2/1980 | Matsui et al. | 359/761 |
| 5,526,191 A | * | 6/1996 | Nishii et al. | 359/757 |
| 6,181,665 B1 | | 1/2001 | Roh | |
| 6,674,555 B1 | | 1/2004 | Curtis et al. | |
| 6,700,686 B2 | | 3/2004 | King et al. | |
| 2006/0262369 A1 | * | 11/2006 | Zeng et al. | 359/29 |

* cited by examiner

*Primary Examiner*—Fayez G. Assaf
(74) *Attorney, Agent, or Firm*—Jeffrey T. Knapp

(57) ABSTRACT

A Fourier transform lens system includes: a first lens group having negative power and a second lens group having positive power disposed at one side of the first lens group with the first lens group and the second lens group being arranged on a common optical axis. The first lens group includes two negative meniscus lenses each having negative power, and each of the negative meniscus lenses has a concave lens surface facing toward a concave lens surface of the other negative meniscus lens. The second lens group includes a positive lens having a convex lens surface facing toward the first lens group. The Fourier transform lens system satisfies the following conditions: (1) $0.1<R_{1R}/f<0.4$; (2) $-0.4<R_{2F}/f<-0.1$; and (3) $0.1<d_{12}/f<0.3$. A holographic storage system using a Fourier transform lens system is also provided.

20 Claims, 17 Drawing Sheets

FOURIER TRANSFORM LENS SYSTEM AND HOLOGRAPHIC STORAGE SYSTEM USING SAME

BACKGROUND

1. Technical Field

The present invention relates to Fourier transform lens systems and a holographic storage system using a Fourier transform lens system.

2. Related Art

Among all of modern systems for data storage, a holographic storage system is believed by many to be the most promising due to its higher data storage density and parallel read/write operation. One kind of holographic storage system is a volume holographic storage system.

In a holographic storage system, data is stored as holograms that result from the interference of a signal beam and a reference beam. Generally speaking, during a data recording process, a laser light beam is split into two coherent beams. One of the coherent beams is referred to as the signal beam, and the other coherent beam is referred to as the reference beam. Data can be encoded within the signal beam by using an encoding device, e.g., a spatial light modulator (SLM). Typically, an SLM is a two-dimensional matrix of pixels. Each pixel in the matrix can be directed as follows: to transmit or reflect light, which corresponds to the binary digit 1; or to block light, which corresponds to the binary digit 0. Once the signal beam is encoded by the SLM, it passes through a Fourier transform lens system, and is incident on a holographic storage medium where it intersects with the reference beam to form an interference pattern (i.e., hologram). The interference pattern records the data encoded in the signal beam to the holographic storage medium. During a data retrieval process, the data recorded in the holographic storage medium is read by illuminating the storage medium with the reference beam. The reference beam diffracts off the stored hologram, generating a reconstructed signal beam proportional to the original signal beam used to store the hologram. The reconstructed signal beam passes through a Fourier transform lens system, and is then typically imaged onto a sensor such as a CCD (charge coupled device) or a CMOS (complementary metal oxide semiconductor) active pixel array device. The sensor is attached to a decoder, which is capable of decoding the data contained in the reconstructed signal beam.

Generally, the above-described data recording process and retrieval process can be accomplished by a single integrated holographic storage system or by two separate holographic systems. In the case of two separate holographic systems, one of these is a holographic recording system for data recording, and the other is a holographic retrieval system for data retrieval. The implementation of holographic recording and retrieval techniques in a commercially viable storage system benefits from a simple and robust design of the Fourier transform lens systems.

Conventionally, in order to obtain a holographic storage system having a very high storage density, an asymmetrical Fourier transform lens system which has a relatively large field of view can be employed. However, the conventional asymmetrical Fourier transform lens system is usually configured to have more than five spherical lens pieces. This makes the holographic storage system unduly awkward and bulky.

What is needed is a Fourier transform lens system having a compact configuration, and a holographic storage system having such kind of Fourier transform lens system.

SUMMARY

A Fourier transform lens system in accordance with a preferred embodiment is provided. The Fourier transform lens system includes: a first lens group having negative power, and a second lens group having positive power disposed at one side of the first lens group with the first lens group and the second lens group being arranged on a common optical axis. The first lens group includes two negative meniscus lenses each having negative power, and each of the negative meniscus lenses has a concave lens surface facing toward a concave lens surface of the other negative meniscus lens. The second lens group includes a positive lens having a convex lens surface facing toward the first lens group. The Fourier transform lens system satisfies the following conditions (1)~(3):

$$0.1 < R_{1R}/f < 0.4; \tag{1}$$

$$-0.4 < R_{2F}/f < -0.1; \text{ and} \tag{2}$$

$$0.1 < d_{12}/f < 0.3; \tag{3}$$

where, f is a total focal length of the Fourier transform lens system, $R_{1R}$ and $R_{2F}$ are radiuses of curvature of the concave lens surfaces of the two negative meniscus lenses respectively, and $d_{12}$ is a air space between the two meniscus lenses along a direction of the optical axis.

In another preferred embodiment, a holographic storage system includes: an encoding device; a holographic storage medium; a sensor; a front group Fourier transform lens system configured for guiding a signal beam encoded by the encoding device to the holographic storage medium whereat the signal beam intersects with a reference beam to write a hologram, and a rear group Fourier transform lens system having a lens arrangement essentially reverse to that of the front group Fourier transform lens system, the rear group Fourier transform lens system being configured for guiding a reconstructed signal beam to the sensor, the reconstructed signal beam produced by the hologram upon illumination thereof with the reference beam. Each of the Fourier transform lens systems includes: a first lens group having negative power, and a second lens group having positive power disposed at one side of the first lens group with the first lens group and the second lens group being arranged on a common optical axis. The first lens group includes two negative meniscus lenses each having negative power, and each of the negative meniscus lenses has a concave lens surface facing toward a concave lens surface of the other negative meniscus lens. The second lens group includes a positive lens having a convex lens surface facing toward the first lens group. The Fourier transform lens system satisfies the above-described conditions (1)~(3).

Compared with conventional Fourier transform lens systems, the Fourier transform lens system in accordance with a preferred embodiment has a compact configuration due to the less lens elements used therein. Furthermore, a holographic storage system using such a Fourier transform lens system in accordance with a preferred embodiment can attain a compact configuration and higher data storage density.

Other advantages and novel features will become more apparent from the following detailed description of embodiments when taken in conjunction with the accompanying drawings.

BRIEF DESCRIPTION OF THE DRAWINGS

The components in the drawings are not necessarily to scale, the emphasis instead being placed upon clearly illustrating the principles of the present Fourier transform lens system and holographic storage system. Moreover, in the drawings, like reference numerals designate corresponding parts throughout the several views.

Figure 1:
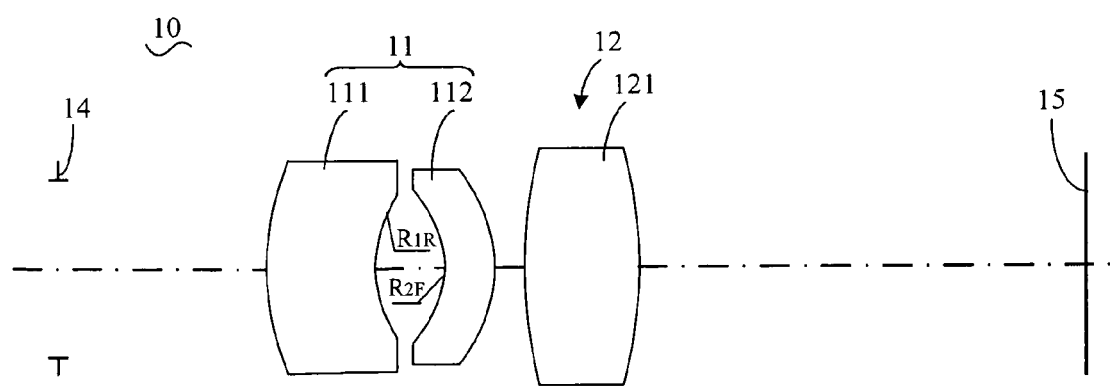
FIG. 1 is a schematic, cross-sectional view of a lens arrangement of a Fourier transform lens system in accordance with a first embodiment of the present invention.
Figure 2:
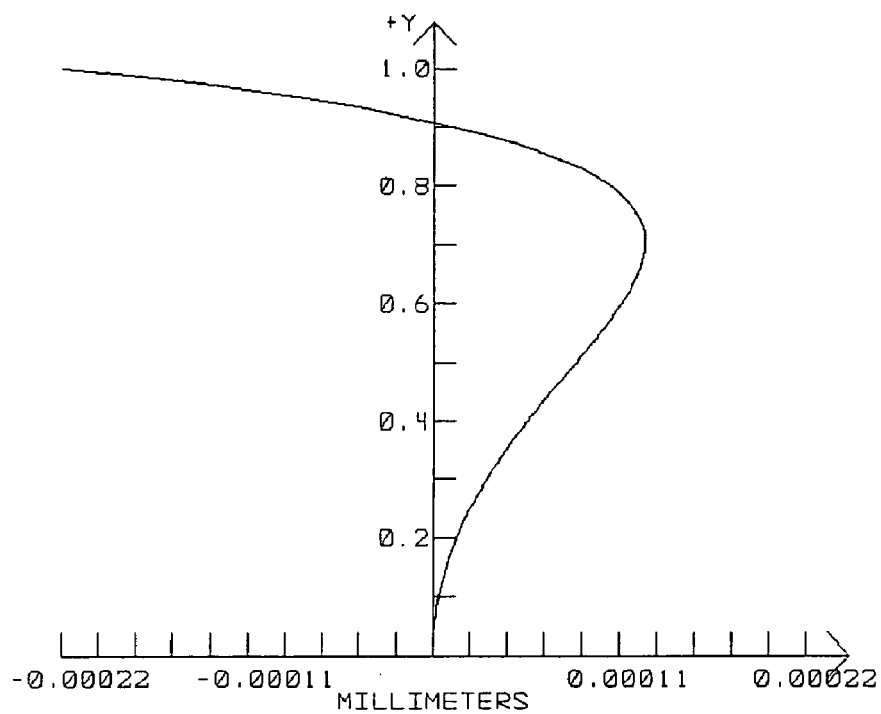
FIG. 2 is a graph showing sine aberrations occurring in a positive optical path of the Fourier transform lens system shown in FIG. 1.

The exemplifications set out herein illustrate various preferred embodiments, in various forms, and such exemplifications are not to be construed as limiting the scope of the Fourier transform lens system and holographic storage system in any manner.

DETAILED DESCRIPTION OF THE EMBODIMENTS

Various embodiments of a Fourier transform lens system will be described below in detail with reference to FIGS. 1–36. The Fourier transform lens system in accordance with each of the below embodiments has a lens arrangement along a common axis in the following order from an object side to an image side: a first lens group having negative refracting power, and a second lens group having positive refracting power. In the following description, references to positive power include positive refracting power, and references to negative power include negative refracting power. The first lens group includes a first negative meniscus lens, and a second negative meniscus lens. The first negative meniscus lens has a convex lens surface facing toward the object side, and a concave lens surface facing toward a concave lens surface of the second negative meniscus lens. The second negative lens has a convex lens surface facing toward the image side. The second lens group includes a positive lens having a convex lens surface facing toward the object side. It is to be understood that the present Fourier transform lens system is not limited to these embodiments. The following are symbols used in each exemplary embodiment, unless the context indicates otherwise:

f: total focal length of the Fourier transform lens system
$f_2$: focal length of the second lens group
F/#: F-number
$2\omega$: field of view
$R_{1R}$: radius of curvature of the concave lens surface of the first negative meniscus lens of the first lens group
$R_{2F}$: radius of curvature of the concave lens surface of the second negative meniscus lens of the first lens group
$d_{12}$: air space between the first negative meniscus lens and the second negative meniscus lens along the optical axis direction
$n_{20}$: refractive index of a material of the second lens group
$n_{10}$: refractive index of a material of the second negative meniscus lens of the first lens group The Fourier transform lens system satisfies the following conditions (1)~(3):

$$0.1 < R_{1R}/f < 0.4; \tag{1}$$

$$-0.4 < R_{2F}/f < -0.1; \text{ and} \tag{2}$$

$$0.1 < d_{12}/f < 0.3; \tag{3}$$

Under the conditions (1)~(3), sine aberrations and spherical aberrations occurring in a positive optical path (namely, an optical path along a direction from the object side to the image side) thereof, and off-axis aberrations occurring in a reverse optical path (namely, an optical path along a direction from the image side to the object side) thereof, are well corrected. The positive optical path lens arrangement can have a relatively large aperture and a small field of view; and the reverse optical path lens arrangement can have a small aperture and a medium field of view.

When the ratio $R_{1R}/f$ is above the upper limit of 0.4, spherical aberrations and sine aberrations occurring in the positive optical path are excessively increased along a negative direction in a reference system, and off-axis aberrations occurring in the reverse optical path are increased along the negative direction. On the other hand, when the ratio $R_{1R}/f$ is below the lower limit of 0.1, spherical aberrations and sine aberrations occurring in the positive optical path are excessively increased along a positive direction in the reference system, and off-axis aberrations occurring in the reverse optical path are increased along the positive direction.

When the ratio $R_{2F}/f$ is above the upper limit of −0.1, spherical aberrations and sine aberrations occurring in the positive optical path are excessively increased along the positive direction, and off-axis aberrations occurring in the reverse optical path are increased along the positive direction. On the other hand, when the ratio $R_{2F}/f$ is below the lower limit of −0.4, spherical aberrations and sine aberrations occurring in the positive optical path are excessively increased along the negative direction, and off-axis aberrations occurring in the reverse optical path are increased along the negative direction.

When the ratio $d_{12}/f$ is above the upper limit of 0.3, spherical aberrations and sine aberrations occurring in the positive optical path are increased along the positive direction and the negative direction respectively, and it is difficult to correct these aberrations. Further, it is also difficult to correct off-axis aberrations occurring in the reverse optical path. On the other hand, when the ratio $d_{12}/f$ is below the lower limit of 0.1, spherical aberrations and sine aberrations occurring in the positive optical path are increased along the negative direction and the positive direction respectively, and it is difficult to correct these aberrations. Further, it is also difficult to correct off-axis aberrations occurring in the reverse optical path.

Preferably, in order to further well correct field curvatures occurring in the Fourier transform lens system, the Fourier transform lens system further satisfies the following conditions (4)~(5):

$$n_{20} > 1.7; \text{ and} \quad (4)$$

$$n_{20} - n_{10} > 0.15. \quad (5)$$

When $n_{20}$ is below the lower limit of 1.7, and $(n_{20}-n_{10})$ is below the lower limit of 0.15, the correction of field curvatures occurring in the reverse optical path can be reduced in some situations.

Further preferably, in order for the second lens group to have very appropriate power distribution, the Fourier transform lens system still further satisfies the following condition (6):

$$0.55 < f_2/f < 0.9. \quad (6)$$

When the ratio $f_2/f$ is above the upper limit of 0.9, a positive power of the second lens group may be unduly small, which can reduce the correction of off-axis aberrations occurring in the reverse optical path in some situations. On the other hand, when the ratio $f_2/f$ is below the lower limit of 0.55, a positive power of the second lens group may be unduly large, which can reduce the correction of spherical aberrations and sine aberration occurring in the positive optical path in some situations.

[Embodiment 1]

Referring to FIG. 1, a Fourier transform lens system 10 in accordance with the first embodiment has a lens arrangement along an optical axis (as indicated by the dotted and dashed line). The lens arrangement includes, in order from an object side to an image side 15: a first lens group 11 having negative power, and a second lens group 12 having positive power. If necessary, in order to reduce or eliminate any effect of stray light and achieve high quality imaging, an aperture stop 14 can be disposed at the object side. The first lens group 11 includes a first negative meniscus lens 111 and a second negative meniscus lens 112 each having negative power. The first negative meniscus lens 111 has a convex lens surface facing toward the object side, and a concave lens surface facing toward the image side 15. The second negative meniscus lens 112 has a convex lens surface facing toward the image side 15, and a concave lens surface facing toward the object side. The concave lens surface of the first negative meniscus lens 111 faces toward the concave lens surface of the second negative meniscus lens 112. The second lens group 12 includes a bi-convex lens 121 having positive power.

Referring to Table 1 below, structural parameters of the Fourier transform lens system 10 are listed. In the table, $R_i$ is a radius of curvature of an i-th surface starting from the aperture stop 14; $d_i$ is a distance between adjacent surfaces starting from the aperture stop 14; and $n_i$ is a refractive index of a material of an i-th lens starting from the aperture stop 14 corresponding to light having a wavelength of 0.532 microns.

TABLE 1

| No. | $R_i$ (mm) | $d_i$ (mm) | $n_i$ |
|---|---|---|---|
| 1 (Aperture stop) | Infinity | 20 | |
| 2 | 19.91359 | 10.90953 | 1.764309 |
| 3 | 13.82753 | 6.772233 | |
| 4 | −11.80158 | 4.945526 | 1.517591 |
| 5 | −15.41247 | 3.34252 | |
| 6 | 55.93577 | 10.90911 | 1.764309 |
| 7 | −46.68527 | 45.32936 | |

It is noted that in the illustrated embodiment: $R_{1R}=R_3=13.82753$ mm, $R_{2F}=R_4=-11.80158$ mm; $d_{12}=d_3=6.772233$ mm; $n_{20}=n_6=1.764309$; and $n_{10}=n_4=1.517591$.

Referring to Table 5 below, in the illustrated embodiment: f is equal to 50 millimeters (hereinafter referred to as mm); the ratio $f_2/f$ is equal to 0.7; F/# of the positive optical path (namely, an optical path along a direction from the object side to the image side 15) is equal to 2.78, and 2ω of the positive optical path is equal to 5.72°; F/# of the reverse optical path (namely, an optical path along a direction from the image side 15 to the object side) is equal to 10, and 2ω of the reverse optical path is equal to 20.72°; $R_{1R}/f$ is approximately equal to 0.28; $R_{2F}/f$ is approximately equal to −0.24; $d_{12}/f$ is approximately equal to 0.135; $n_{20}$ is approximately equal to 1.764309; and $(n_{20}-n_{10})$ is approximately equal to 0.24672. Accordingly, the conditions (1)~(6) as described above are satisfied.

Figure 3:
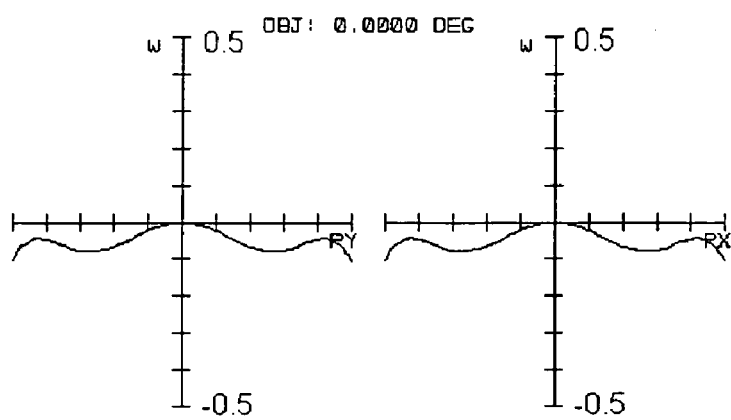
FIGS. 3–5 are graphs respectively showing optical path differences occurring in the positive optical path of the Fourier transform lens system shown in FIG. 1.
Figure 4:
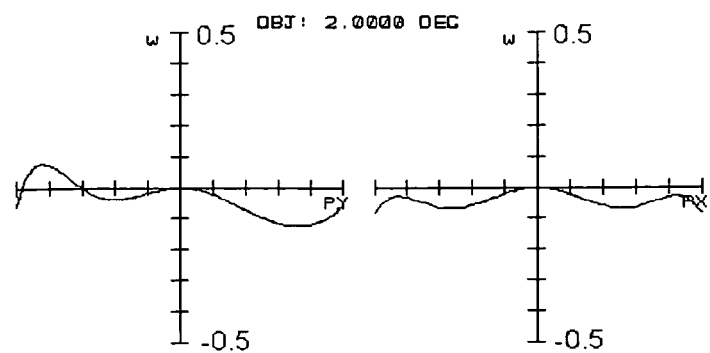
Figure 5:
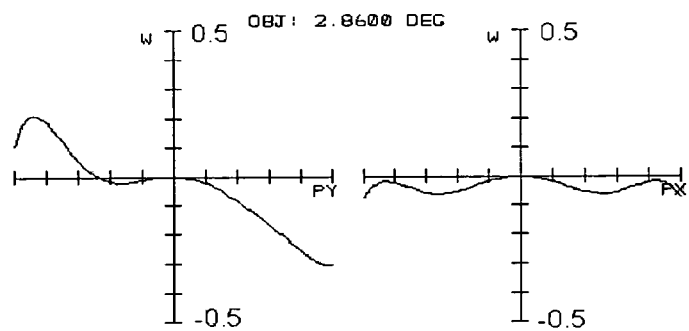
Figure 6:
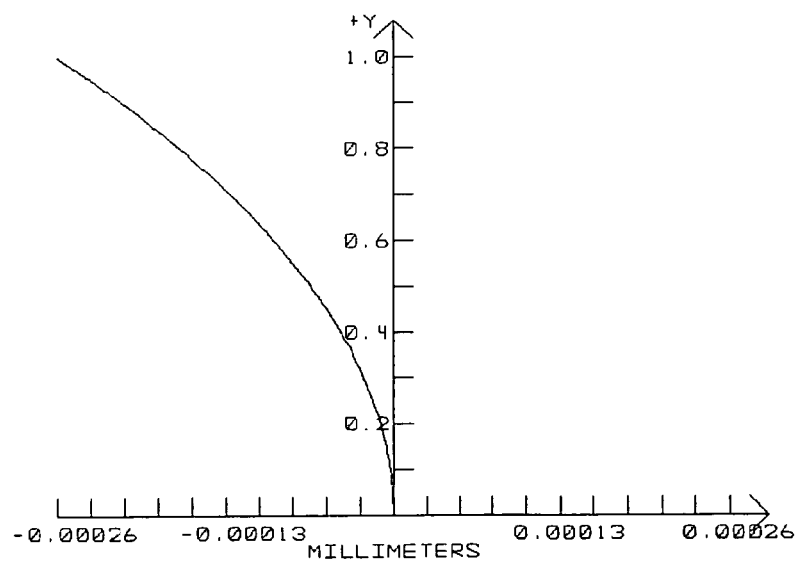
FIG. 6 is a graph showing sine aberrations occurring in a reverse optical path of the Fourier transform lens system shown in FIG. 1.
Figure 7:
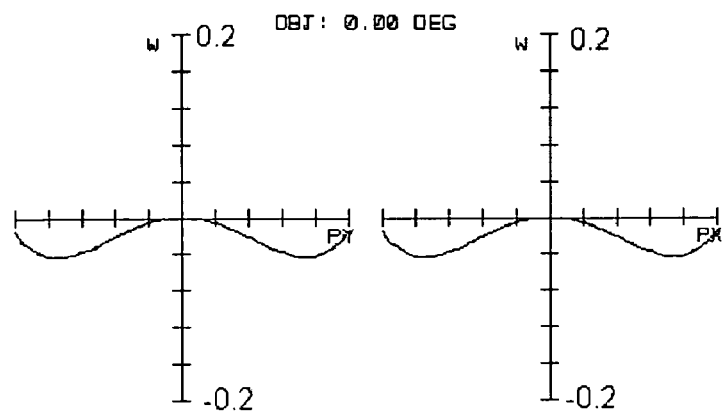
FIGS. 7–9 are graphs respectively showing optical path differences occurring in the reverse optical path of the Fourier transform lens system shown in FIG. 1.
Figure 8:
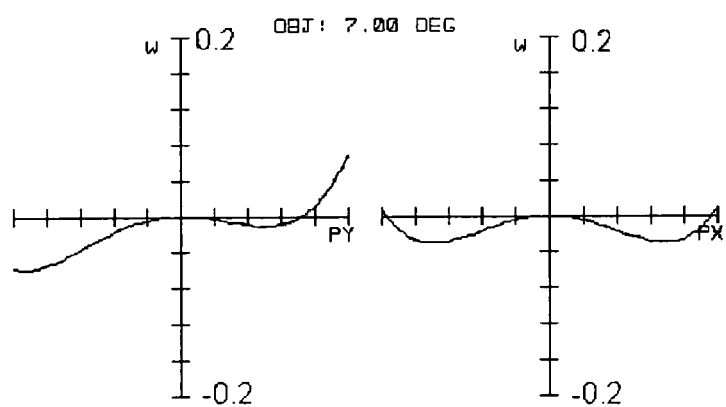
Figure 9:
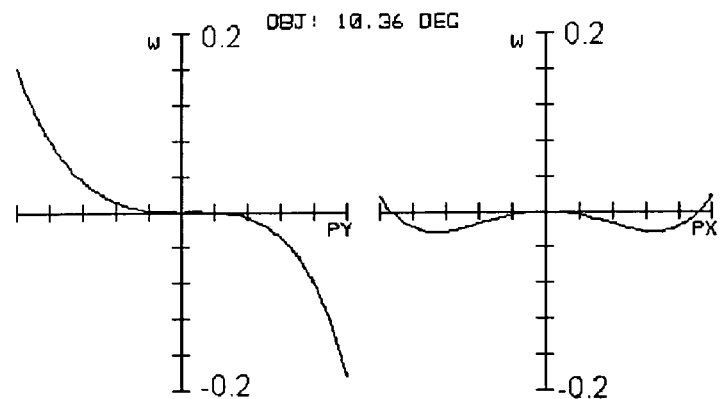

Referring to FIGS. 2 to 9, FIG. 2 and FIG. 6 are graphs respectively showing sine aberrations occurring in the positive optical path and the reverse optical path. FIGS. 3–5 are graphs respectively showing optical path differences occurring in the positive optical path. FIGS. 7–9 are graphs respectively showing optical path differences occurring in the reverse optical path. It is noted that: sine aberrations occurring in both the positive optical path and reverse optical path are very small under conditions (1)~(6), such that chief parallel rays emitting from the Fourier transform lens system 10 along the optical axis direction thereof satisfy the sine condition (namely, a paraxial condition of ideal image height fsin ω); and that optical path differences occurring in both the positive optical path and reverse optical path are very small under conditions (1)~(6), such that the Fourier transform lens system 10 achieves diffractive-limit. Accordingly, the positive optical path lens arrangement of the Fourier transform lens system 10 has a relatively large aperture and a small field of view, and the reverse optical path lens arrangement of the Fourier transform lens system 10 has a small aperture and a medium field of view. Thereby, the Fourier transform lens system 10 is suitable for use in a holographic storage system; for example, a holographic recording system for data recording, a holographic data retrieval system for data retrieval, etc.

[Embodiment 2]

Figure 10:
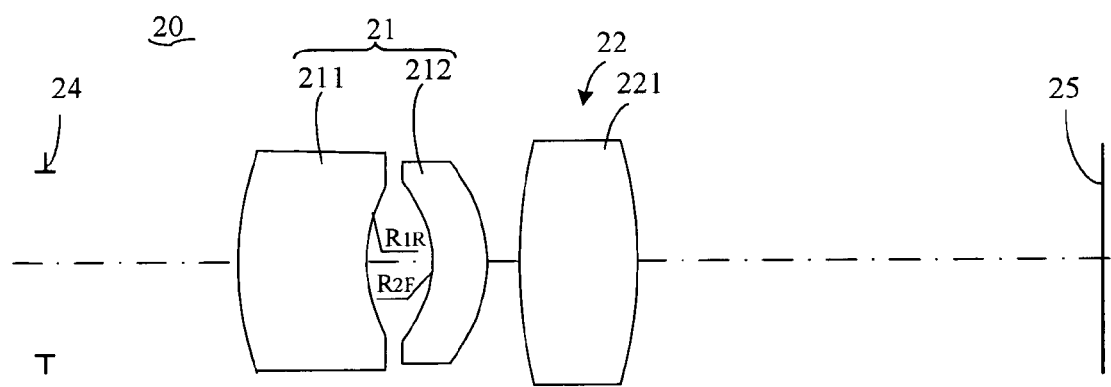
FIG. 10 is a schematic, cross-sectional view of a lens arrangement of a Fourier transform lens system in accordance with a second embodiment of the present invention.
Figure 11:
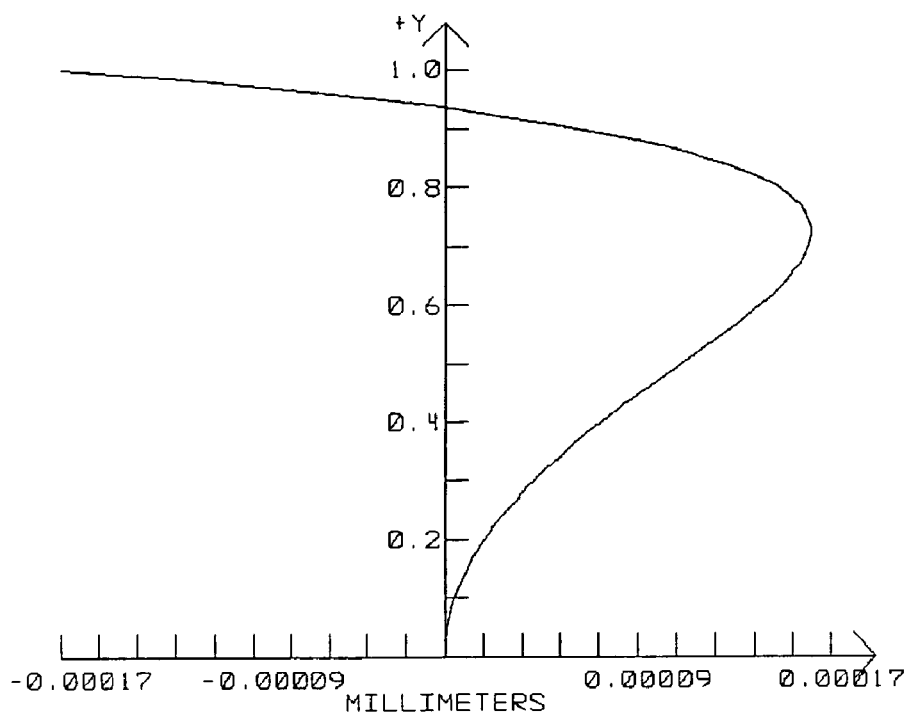
FIG. 11 is a graph showing sine aberrations occurring in a positive optical path of the Fourier transform lens system shown in FIG. 10.

Referring to FIG. 10, a Fourier transform lens system 20 in accordance with the second embodiment has a lens arrangement along an optical axis (as indicated by the dotted and dashed line). The lens arrangement includes, in order from an object side to an image side 25: a first lens group 21 having negative power, and a second lens group 22 having positive power. If necessary, in order to reduce or eliminate any effect of stray light and achieve high quality imaging, an aperture stop 24 can be disposed at the object side. The first lens group 21 includes a first negative meniscus lens 211 and a second negative meniscus lens 212 each having negative power. The first negative meniscus lens 211 has a convex lens surface facing toward the object side, and a concave lens surface facing toward the image side 25. The second negative meniscus lens 212 has a convex lens surface facing toward the image side 25, and a concave lens surface facing toward the object side. The concave lens surface of the first negative meniscus lens 211 faces toward the concave lens surface of the second negative meniscus lens 212. The second lens group 22 includes a bi-convex lens 221 having positive power.

Referring to Table 2 below, structural parameters of the Fourier transform lens system 20 are listed. In the table, $R_i$ is a radius of curvature of an i-th surface starting from the aperture stop 24; $d_i$ is a distance between adjacent surfaces starting from the aperture stop 24; and $n_i$ is a refractive index of a material of an i-th lens starting from the aperture stop 24 corresponding to light having a wavelength of 0.532 microns.

TABLE 2

| No. | $R_i$ (mm) | $d_i$ (mm) | $n_i$ |
|---|---|---|---|
| 1 (Aperture stop) | Infinity | 20.69028 | |
| 2 | 22.17936 | 12.50001 | 1.764309 |
| 3 | 15.08361 | 7.469536 | |
| 4 | −12.9065 | 5.32697 | 1.507225 |
| 5 | −16.91654 | 3.838513 | |
| 6 | 63.07369 | 12.50001 | 1.764309 |
| 7 | −48.4945 | 49.93956 | |

It is noted that in the illustrated embodiment: $R_{1R}=R_3=15.08361$ mm; $R_{2F}=R_4=-12.9065$ mm; $d_{12}=d_3=7.469536$ mm; $n_{20}=n_6=1.764309$; and $n_{10}=n_4=1.507225$.

Referring to Table 5 below, in the illustrated embodiment: f is equal to 55 mm; the ratio $f_2/f$ is equal to 0.69; F/# of the positive optical path (namely, an optical path along a direction from the object side to the image side 25) is equal to 2.75, and 2ω of the positive optical path is equal to 5.20°; F/# of the reverse optical path (namely, an optical path along a direction from the image side 25 to the object side) is equal to 11, and 2ω of the reverse optical path is equal to 21°; $R_{1R}/f$ is approximately equal to 0.27; $R_{2F}/f$ is approximately equal to −0.24; $d_{12}/f$ is approximately equal to 0.136; $n_{20}$ is approximately equal to 1.764309; and $(n_{20}-n_{10})$ is approximately equal to 0.25708. Accordingly, the conditions (1)~(6) as described above are satisfied.

Figure 12:
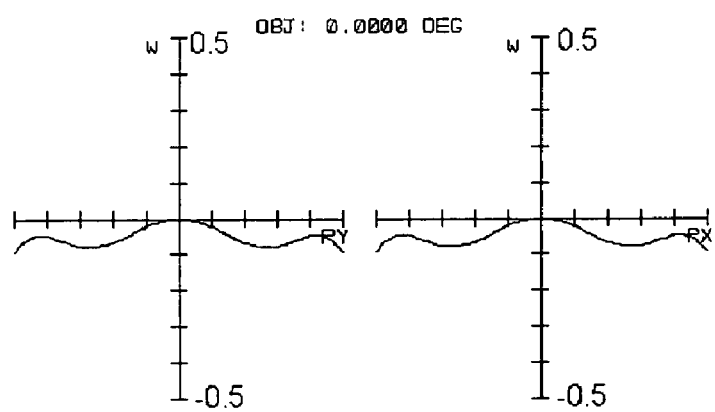
FIGS. 12–14 are graphs respectively showing optical path differences occurring in the positive optical path of the Fourier transform lens system shown in FIG. 10.
Figure 13:
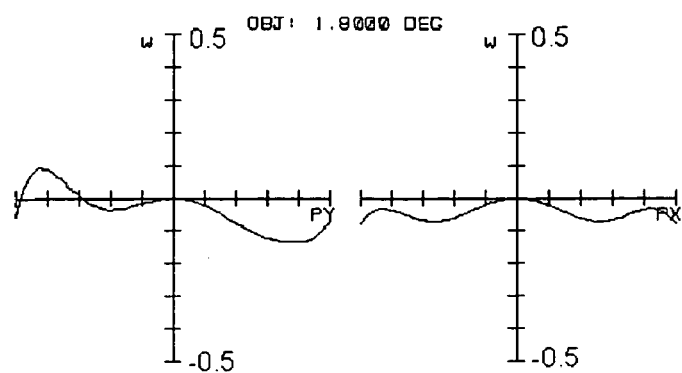
Figure 14:
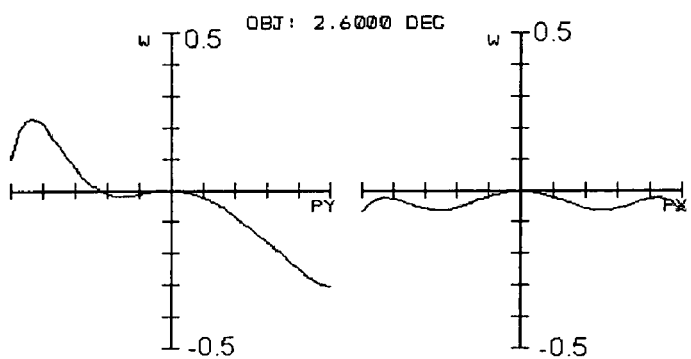
Figure 15:
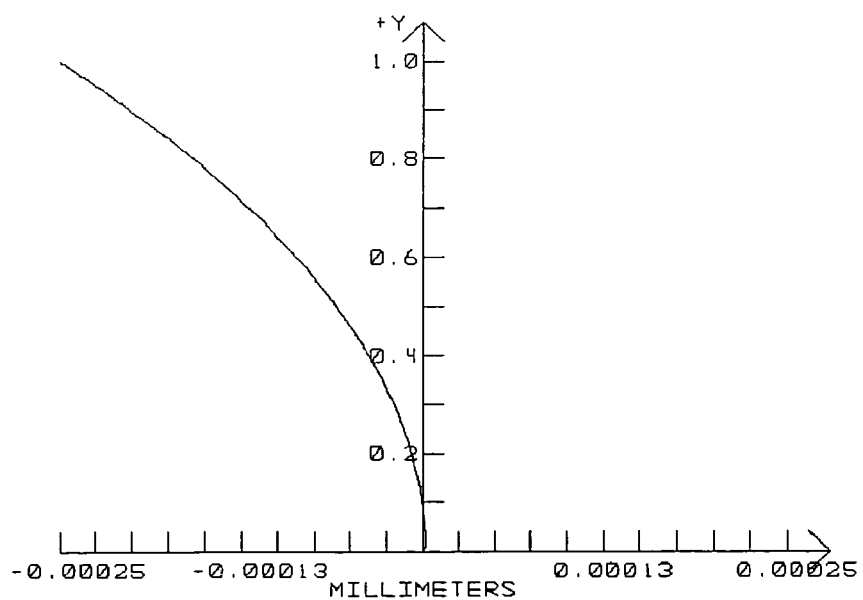
FIG. 15 is a graph showing sine aberrations occurring in a reverse optical path of the Fourier transform lens system shown in FIG. 10.
Figure 16:
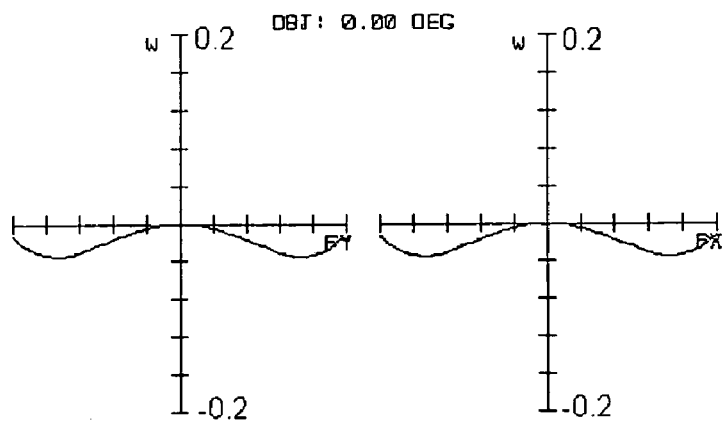
FIGS. 16–18 are graphs respectively showing optical path differences occurring in the reverse optical path of the Fourier transform lens system shown in FIG. 10.
Figure 17:
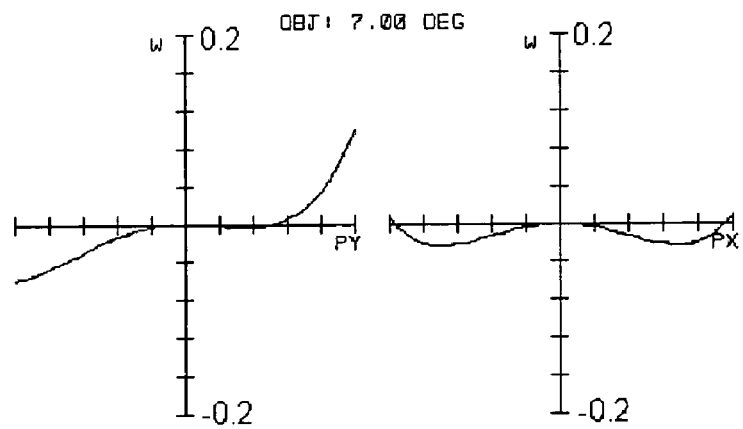
Figure 18:
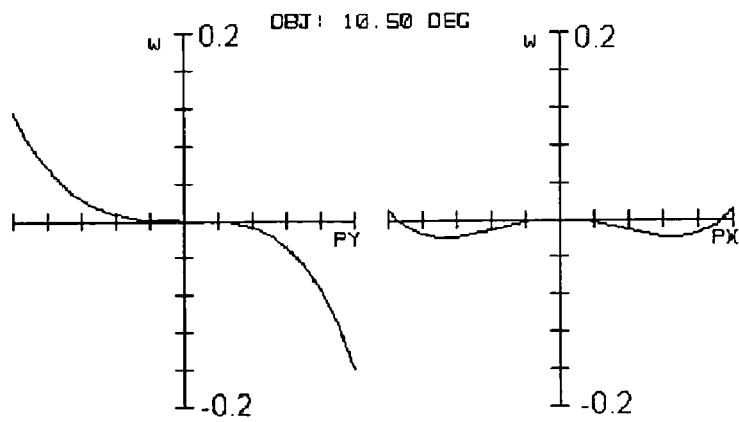

Referring to FIGS. 11 to 18, FIG. 11 and FIG. 15 are graphs respectively showing sine aberrations occurring in the positive optical path and the reverse optical path. FIGS. 12–14 are graphs respectively showing optical path differences occurring in the positive optical path. FIGS. 16–18 are graphs respectively showing optical path differences occurring in the reverse optical path. It is noted that: sine aberrations occurring in both the positive optical path and reverse optical path are very small under conditions (1)~(6), such that chief parallel rays emitting from the Fourier transform lens system 20 along the optical axis direction thereof satisfy the sine condition; and that optical path differences occurring in both the positive optical path and reverse optical path are very small under conditions (1)~(6), such that the Fourier transform lens system 20 achieves diffractive-limit. Accordingly, the positive optical path lens arrangement of the Fourier transform lens system 20 has a relatively large aperture and a small field of view, and the reverse optical path lens arrangement of the Fourier transform lens system 20 has a small aperture and a medium field of view. Thereby, the Fourier transform lens system 20 is suitable for use in a holographic storage system; for example, a holographic recording system for data recording, a holographic data retrieval system for data retrieval, etc.

[Embodiment 3]

Figure 19:
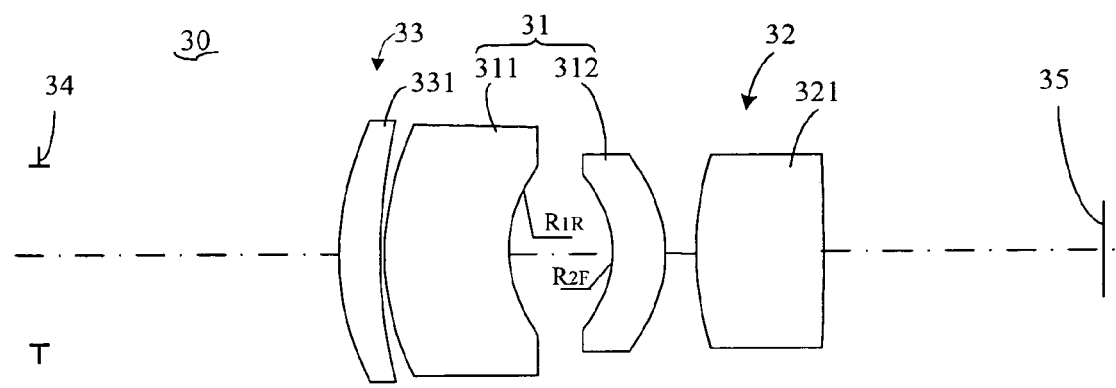
FIG. 19 is a schematic, cross-sectional view of a lens arrangement of a Fourier transform lens system in accordance with a third embodiment of the present invention.
Figure 20:
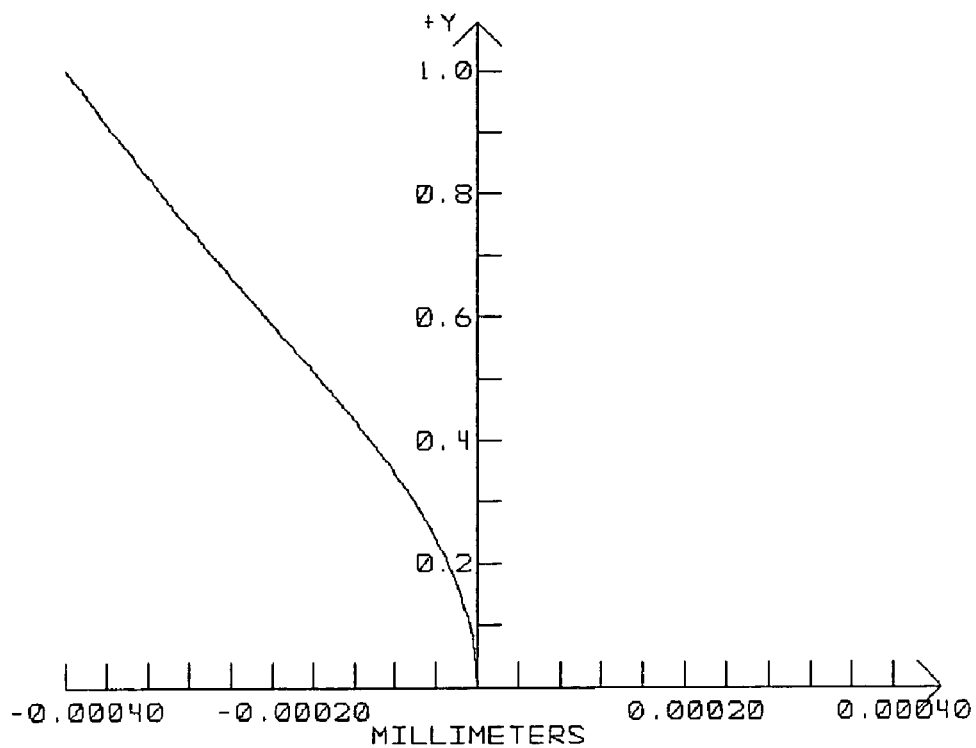
FIG. 20 is a graph showing sine aberrations occurring in a positive optical path of the Fourier transform lens system shown in FIG. 19.

Referring to FIG. 19, a Fourier transform lens system 30 in accordance with the third embodiment has a lens arrangement along an optical axis (as indicated by the dotted and dashed line). The lens arrangement includes, in order from an object side to an image side 35: a third lens group 33 have positive power, a first lens group 31 having negative power, and a second lens group 32 having positive power. If necessary, in order to reduce or eliminate any effect of stray light and achieve high quality imaging, an aperture stop 34 can be disposed at the object side. The first lens group 31 includes a first negative meniscus lens 311 and a second negative meniscus lens 312 each having negative power. The first negative meniscus lens 311 has a convex lens surface facing toward the object side, and a concave lens surface facing toward the image side 35. The second negative meniscus lens 312 has a convex lens surface facing toward the image side 35, and a concave lens surface facing toward the object side. The concave lens surface of the first negative meniscus lens 311 faces toward the concave lens surface of the second negative meniscus lens 312. The second lens group 32 includes a bi-convex lens 321 having positive power. The third lens group 33 includes a positive meniscus lens 331 having positive power. The positive meniscus lens 331 has a convex lens surface facing toward the object side, and a concave lens surface facing toward the image side 35.

Referring to Table 3 below, structural parameters of the Fourier transform lens system 30 are listed. In the table, $R_i$ is a radius of curvature of an i-th surface starting from the aperture stop 34; $d_i$ is a distance between adjacent surfaces starting from the aperture stop 34; and $n_i$ is a refractive index of a material of an i-th lens starting from the aperture stop 34 corresponding to light having a wavelength of 0.532 microns.

TABLE 3

| No. | $R_i$ (mm) | $d_i$ (mm) | $n_i$ |
|---|---|---|---|
| 1 (Aperture stop) | Infinity | 20.599 | |
| 2 | 26.42918 | 2.798674 | 1.679589 |
| 3 | 48.42548 | 0.2726902 | |
| 4 | 14.69828 | 8.862436 | 1.764309 |
| 5 | 9.369214 | 7.182503 | |
| 6 | −12.32391 | 4.65212 | 1.551456 |
| 7 | −16.24008 | 1.752739 | |
| 8 | 26.78252 | 9.005193 | 1.764309 |
| 9 | −150.1444 | 20.01926 | |

It is noted that in the illustrated embodiment: $R_{1R}=R_5=9.369214$ mm; $R_{2F}=R_6=-12.32391$ mm; $d_{12}=d_5=7.182503$ mm; $n_{20}=n_8=1.764309$; and $n_{10}=n_6=1.551456$.

Referring to Table 5 below, in the illustrated embodiment: f is equal to 40 mm; the ratio $f_2/f$ is equal to 0.76; F/# of the positive optical path (namely, an optical path along a direction from the object side to the image side 35) is equal to 2.25, and 2ω of the positive optical path is equal to 5.72°; F/# of the reverse optical path (namely, an optical path along a direction from the image side 35 to the object side) is equal to 10, and 2ω of the reverse optical path is equal to 26°; $R_{1R}/f$ is approximately equal to 0.23; $R_{2F}/f$ is approximately equal to −0.31; $d_2/f$ is approximately equal to 0.180; $n_{20}$ is approximately equal to 1.764309; and $(n_{20}-n_{10})$ is approximately equal to 0.21285. Accordingly, the conditions (1)~(6) as described above are satisfied.

Figure 21:
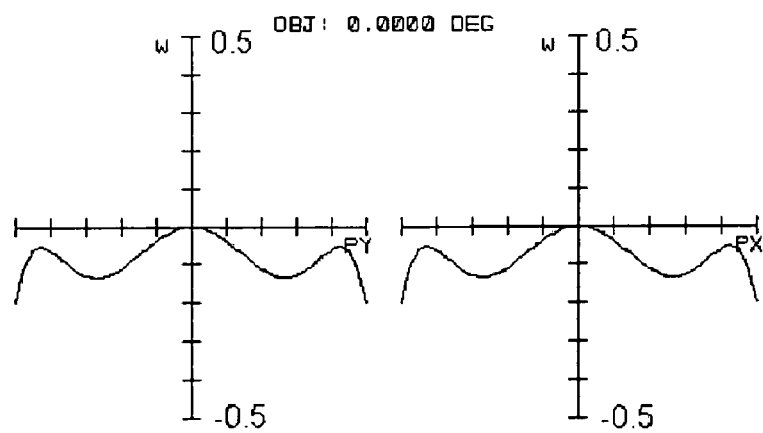
FIGS. 21–23 are graphs respectively showing optical path differences occurring in the positive optical path of the Fourier transform lens system shown in FIG. 19.
Figure 22:
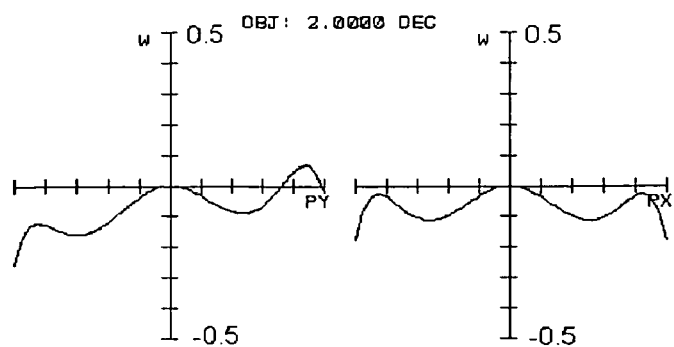
Figure 23:
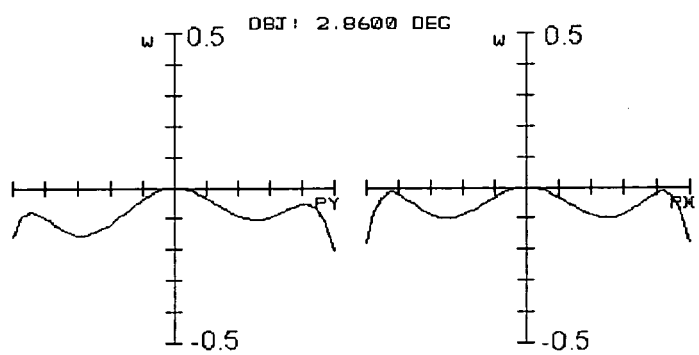
Figure 24:
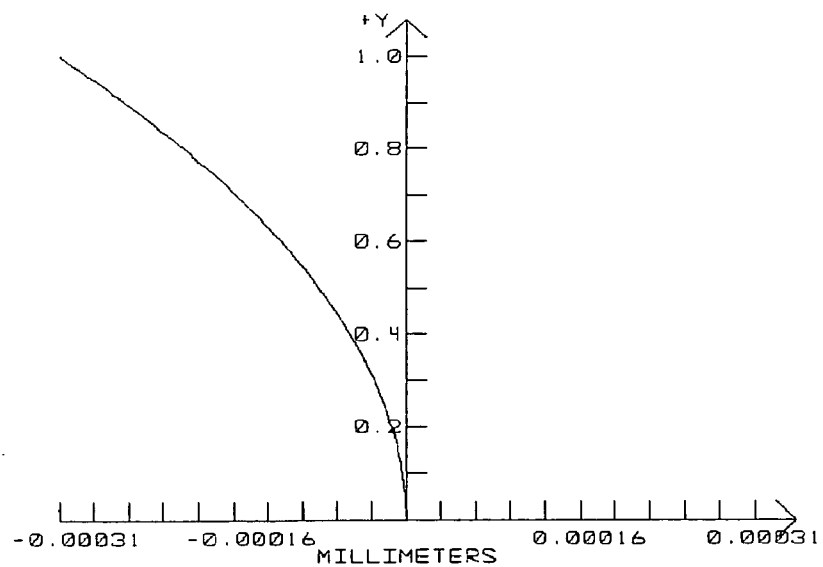
FIG. 24 is a graph showing sine aberrations occurring in a reverse optical path of the Fourier transform lens system shown in FIG. 19.
Figure 25:
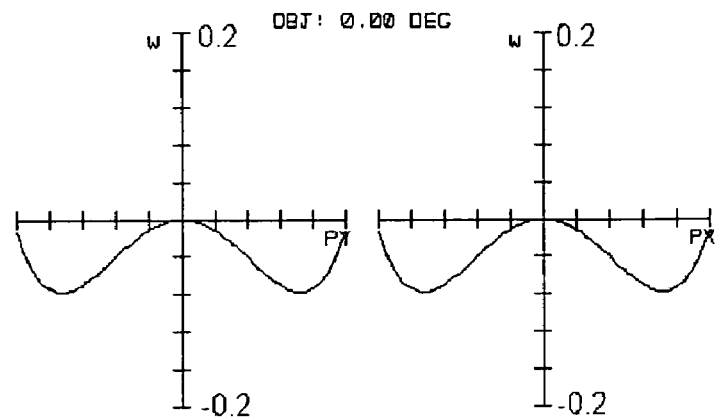
FIGS. 25–27 are graphs respectively showing optical path differences occurring in the reverse optical path of the Fourier transform lens system shown in FIG. 19.
Figure 26:
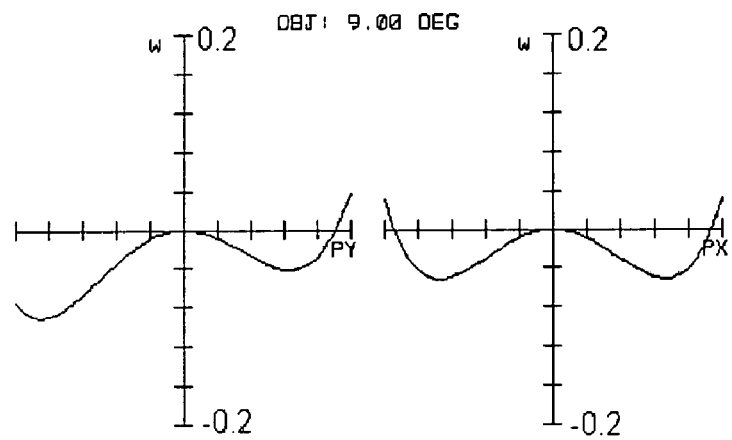
Figure 27:
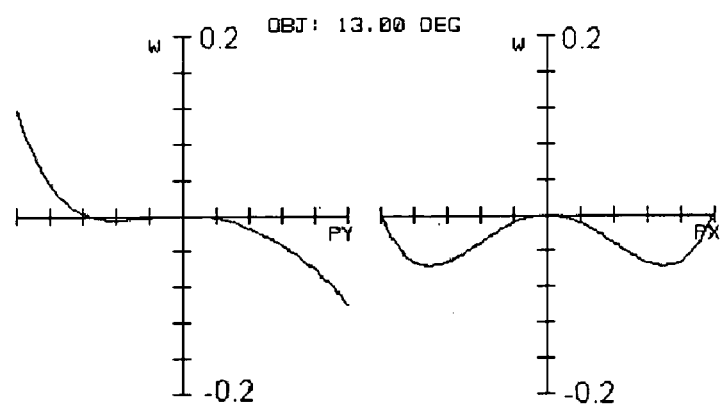

Referring to FIGS. 20 to 27, FIG. 20 and FIG. 24 are graphs respectively showing sine aberrations occurring in the positive optical path and the reverse optical path. FIGS. 21–23 are graphs respectively showing optical path differences occurring in the positive optical path. FIGS. 25–27 are graphs respectively showing optical path differences occurring in the reverse optical path. It is noted that: sine aberrations occurring in both the positive optical path and reverse optical path are very small under conditions (1)~(6), such that chief parallel rays emitting from the Fourier transform lens system 30 along the optical axis direction thereof satisfy the sine condition; and that optical path differences occurring in both the positive optical path and reverse optical path are very small under conditions (1)~(6), such that the Fourier transform lens system 30 achieves diffractive-limit. Accordingly, the positive optical path lens arrangement of the Fourier transform lens system 30 has a relatively large aperture and a small field of view, and the reverse optical path lens arrangement of the Fourier transform lens system 30 has a small aperture and a medium field of view. Thereby, the Fourier transform lens system 30 is suitable for use in a holographic storage system; for example, a holographic recording system for data recording, a holographic data retrieval system for data retrieval, etc.

[Embodiment 4]

Figure 28:
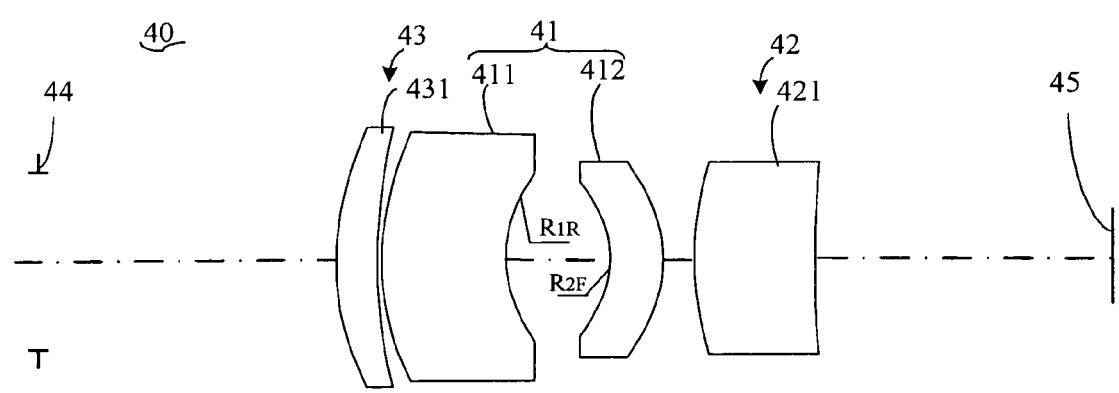
FIG. 28 is a schematic, cross-sectional view of a lens arrangement of a Fourier transform lens system in accordance with a fourth embodiment of the present invention.
Figure 29:
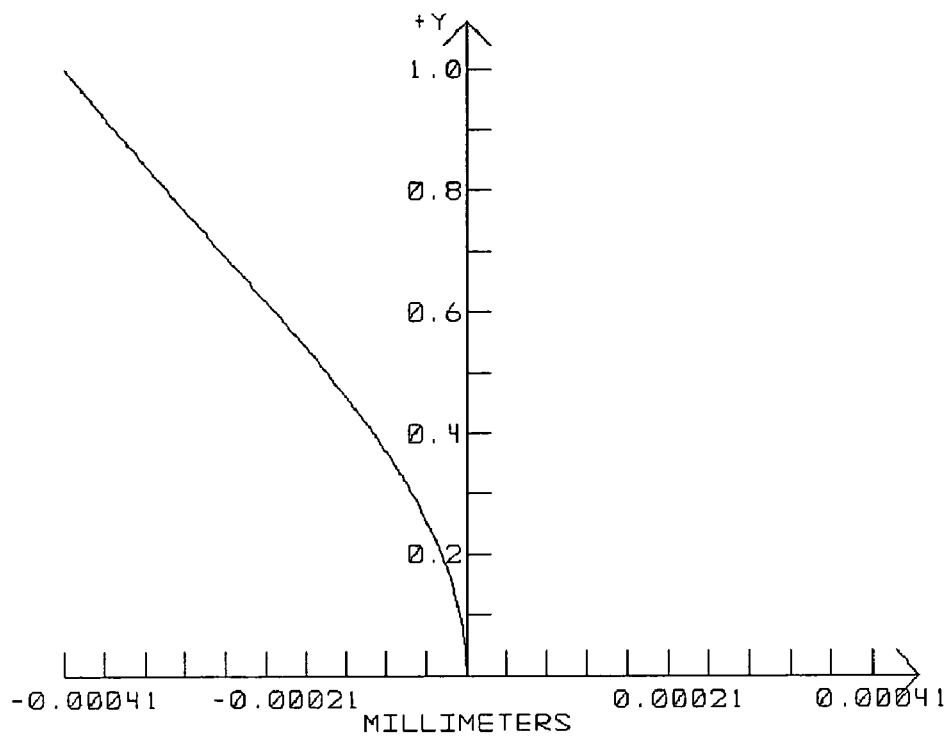
FIG. 29 is a graph showing sine aberrations occurring in a positive optical path of the Fourier transform lens system shown in FIG. 28.

Referring to FIG. 28, a Fourier transform lens system 40 in accordance with the fourth embodiment has a lens arrangement along an optical axis (as indicated by the dotted and dashed line). The lens arrangement includes, in order from an object side to an image side 45: a third lens group 43 have positive power, a first lens group 41 having negative power, and a second lens group 42 having positive power. If necessary, in order to reduce or eliminate any effect of stray light and achieve high quality imaging, an aperture stop 44 can be disposed at the object side. The first lens group 41 includes a first negative meniscus lens 411 and a second negative meniscus lens 412 each having negative power. The first negative meniscus lens 411 has a convex lens surface facing toward the object side, and a concave lens surface facing toward the image side 45. The second negative meniscus lens 412 has a convex lens surface facing toward the image side 45, and a concave lens surface facing toward the object side. The concave lens surface of the first negative meniscus lens 411 faces toward the concave lens surface of the second negative meniscus lens 412. The second lens group 42 includes a positive lens 421 having positive power. The positive lens 421 has a convex lens surface facing toward the object side, and a concave lens surface facing toward the image side 45. The third lens group 43 includes a positive meniscus lens 431 having positive power. The positive meniscus lens 431 has a convex lens surface facing toward the object side, and a concave lens surface facing toward the image side 45.

Referring to Table 4 below, structural parameters of the Fourier transform lens system 40 are listed. In the table, $R_i$ is a radius of curvature of an i-th surface starting from the aperture stop 44; $d_i$ is a distance between adjacent surfaces starting from the aperture stop 44; and $n_i$ is a refractive index of a material of an i-th lens starting from the aperture stop 44 corresponding to light having a wavelength of 0.532 microns.

TABLE 4

| No. | $R_i$ (mm) | $d_i$ (mm) | $n_i$ |
|---|---|---|---|
| 1 (Aperture stop) | Infinity | 30.000 | |
| 2 | 30.68794 | 3.2984 | 1.679589 |
| 3 | 68.36457 | 0.3000 | |
| 4 | 16.10705 | 10.000 | 1.764309 |
| 5 | 10.06888 | 5.2516 | |
| 6 | −14.21065 | 3.4300 | 1.551456 |
| 7 | −16.87054 | 6.4544 | |
| 8 | 24.26414 | 10.0000 | 1.764309 |
| 9 | 137.9904 | 17.7704 | |

It is noted that in the illustrated embodiment: $R_{1R}=R_5=10.06888$ mm; $R_{2F}=R_6=-14.21065$ mm; $d_{12}=d_5=5.2516$ mm; $n_{20}=n_8=1.764309$; and $n_{10}=n_6=1.551456$.

Referring to Table 5 below, in the illustrated embodiment: f is equal to 44 mm; the ratio $f_2/f$ is equal to 0.84; F/# of the positive optical path (namely, an optical path along a direction from the object side to the image side 45) is equal to 2.2, and 2ω of the positive optical path is equal to 5.2°; F/# of the reverse optical path (namely, an optical path along a direction from the image side 45 to the object side) is equal to 11, and 2ω of the reverse optical path is equal to 25.6°; $R_{1R}/f$ is approximately equal to 0.23; $R_{2F}/f$ is approximately equal to −0.32; $d_{12}/f$ is approximately equal to 0.12; $n_{20}$ is approximately equal to 1.764309; and $(n_{20}-n_{10})$ is approximately equal to 0.21285. Accordingly, the conditions (1)~(6) as described above are satisfied.

Figure 30:
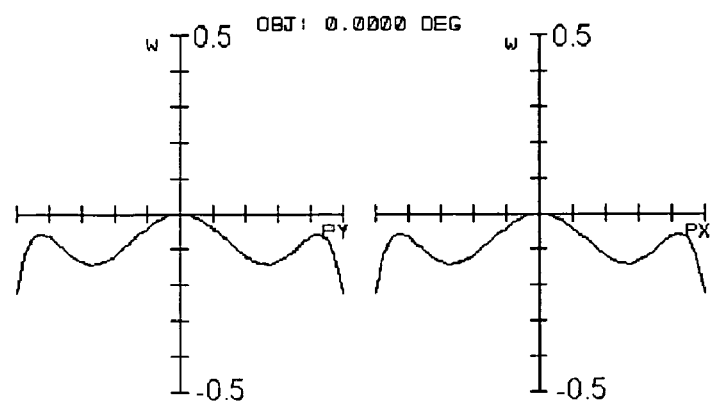
FIGS. 30–32 are graphs respectively showing optical path differences occurring in the positive optical path of the Fourier transform lens system shown in FIG. 28.
Figure 31:
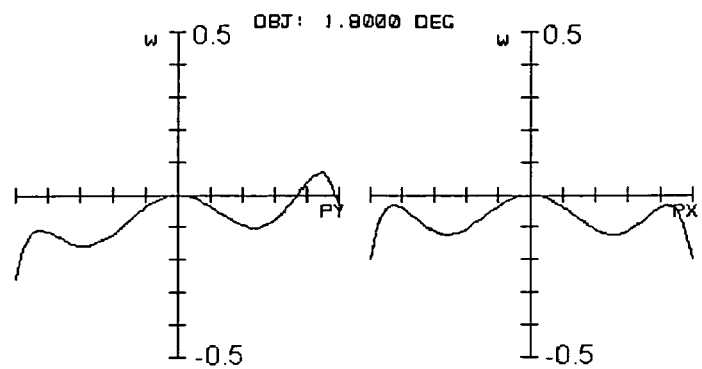
Figure 32:
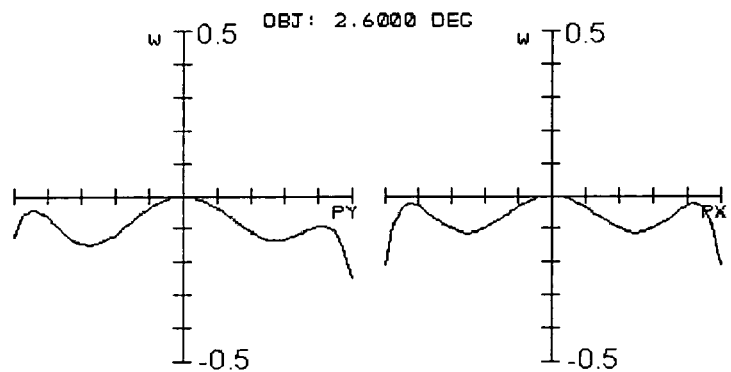
Figure 33:
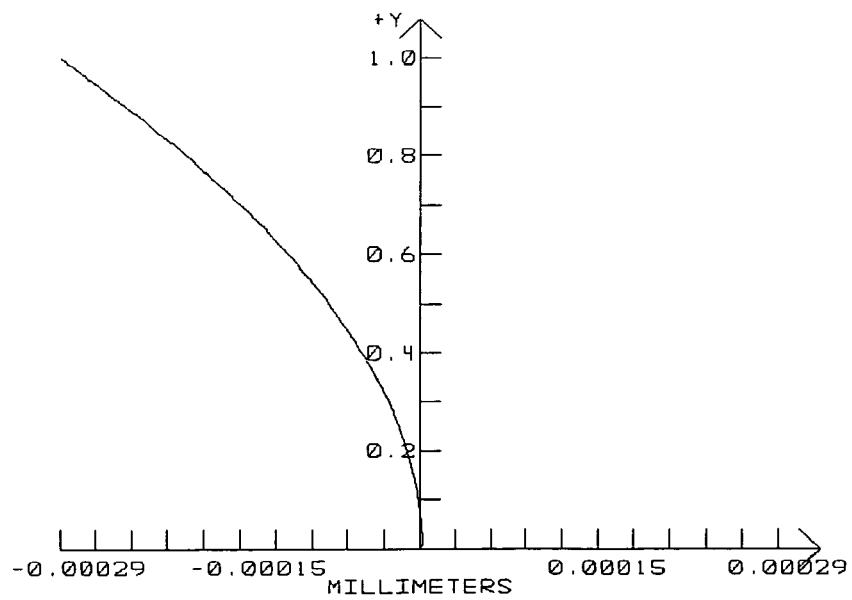
FIG. 33 is a graph showing sine aberrations occurring in a reverse optical path of the Fourier transform lens system shown in FIG. 28.
Figure 34:
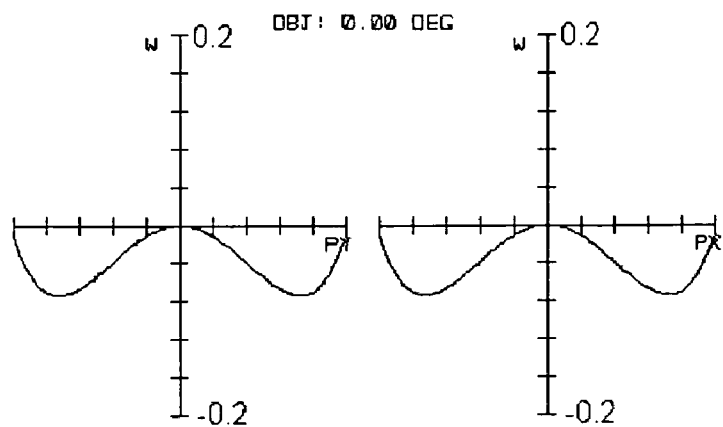
FIGS. 34–36 are graphs respectively showing optical path differences occurring in the reverse optical path of the Fourier transform lens system shown in FIG. 28.
Figure 35:
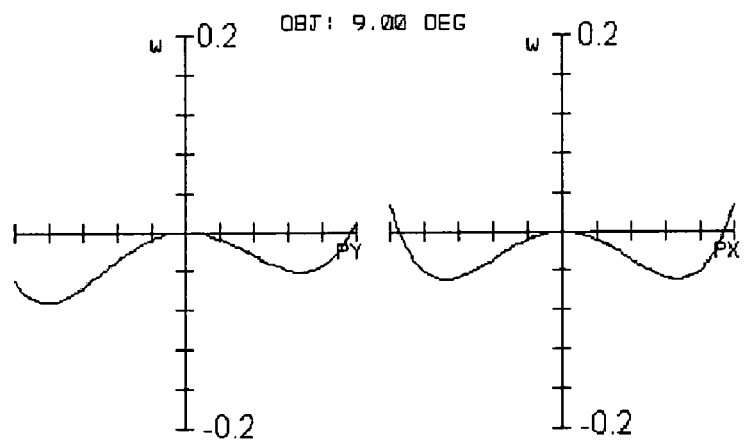
Figure 36:
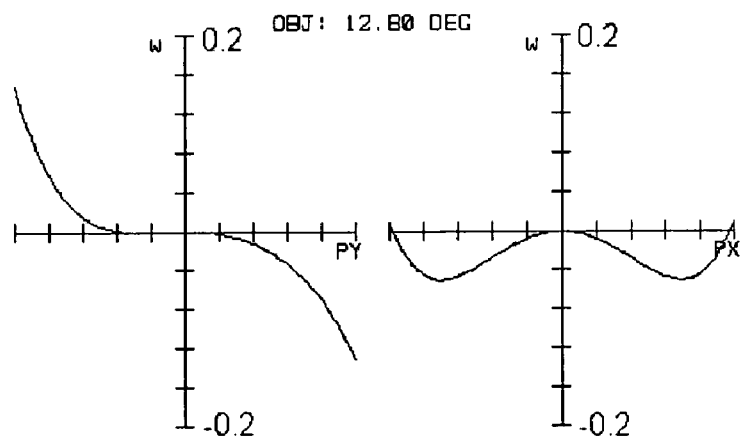

Referring to FIGS. 29 to 36, FIG. 29 and FIG. 33 are graphs respectively showing sine aberrations occurring in the positive optical path and the reverse optical path. FIGS. 30–32 are graphs respectively showing optical path differences occurring in the positive optical path. FIGS. 34–36 are graphs respectively showing optical path differences occurring in the reverse optical path. It is noted that: sine aberrations occurring in both the positive optical path and reverse optical path are very small under conditions (1)~(6), such that chief parallel rays emitting from the Fourier transform lens system 40 along the optical axis direction thereof satisfy the sine condition; and that optical path differences occurring in both the positive optical path and reverse optical path are very small under conditions (1)~(6), such that the Fourier transform lens system 40 achieves diffractive-limit. Accordingly, the positive optical path lens arrangement of the Fourier transform lens system 40 has a relatively large aperture and a small field of view, and the reverse optical path lens arrangement of the Fourier transform lens system 40 has a small aperture and a medium field of view. Thereby, the Fourier transform lens system 40 is suitable for use in a holographic storage system; for example, a holographic recording system for data recording, a holographic data retrieval system for data retrieval, etc.

Table 5 below lists relative parameters of optical properties of each of the four above-described embodiments of the Fourier transform lens system.

During a data recording process, the signal beam 113 propagates along the optical axis direction through the front group Fourier transform lens system 104, and is incident on the holographic storage medium 106 whereat it intersects with a reference beam 114 also incident on the holographic storage medium 106 to write an interference pattern (i.e., hologram). The interference pattern records data encoded in the signal beam 113 in the holographic storage medium 106. The signal beam 113 and the reference beam 114 usually are two coherent light beams. In general, the coherent light beams are generated from a laser light beam that is split into two parts.

During a data retrieval process, a reconstructed signal beam 115 is produced by illuminating the hologram stored in the holographic storage medium 106 with the reference beam 114. The reconstructed signal beam 115 is relayed by the rear group Fourier transform lens system 108 to the sensor 110, and is detected by the sensor 110.

Generally, the front group Fourier transform lens system 104 and rear group Fourier transform lens system 108 have reverse lens arrangements. A focal length of the front group Fourier transform lens system 104 can be different from or the same as that of the rear group Fourier transform lens

TABLE 5

| Embodiment | Positive optical path | | Reverse optical path | | f(mm) | $R_{1R}/f$ | $R_{2F}/f$ | $d_{12}/f$ | $n_{20} - n_{10}$ | $n_{20}$ | $f_2/f$ |
| --- | --- | --- | --- | --- | --- | --- | --- | --- | --- | --- | --- |
| | F/# | 2ω(°) | F/# | 2ω(°) | | | | | | | |
| 1 | 2.78 | 5.72 | 10 | 20.72 | 50 | 0.28 | −0.24 | 0.135 | 0.24672 | 1.764309 | 0.7 |
| 2 | 2.75 | 5.20 | 11 | 21 | 55 | 0.27 | −0.24 | 0.136 | 0.25708 | 1.764309 | 0.69 |
| 3 | 2.25 | 5.72 | 10 | 26 | 40 | 0.23 | −0.31 | 0.180 | 0.21285 | 1.764309 | 0.76 |
| 4 | 2.2 | 5.2 | 11 | 25.6 | 44 | 0.23 | −0.32 | 0.12 | 0.21285 | 1.764309 | 0.84 |

Figure 37:
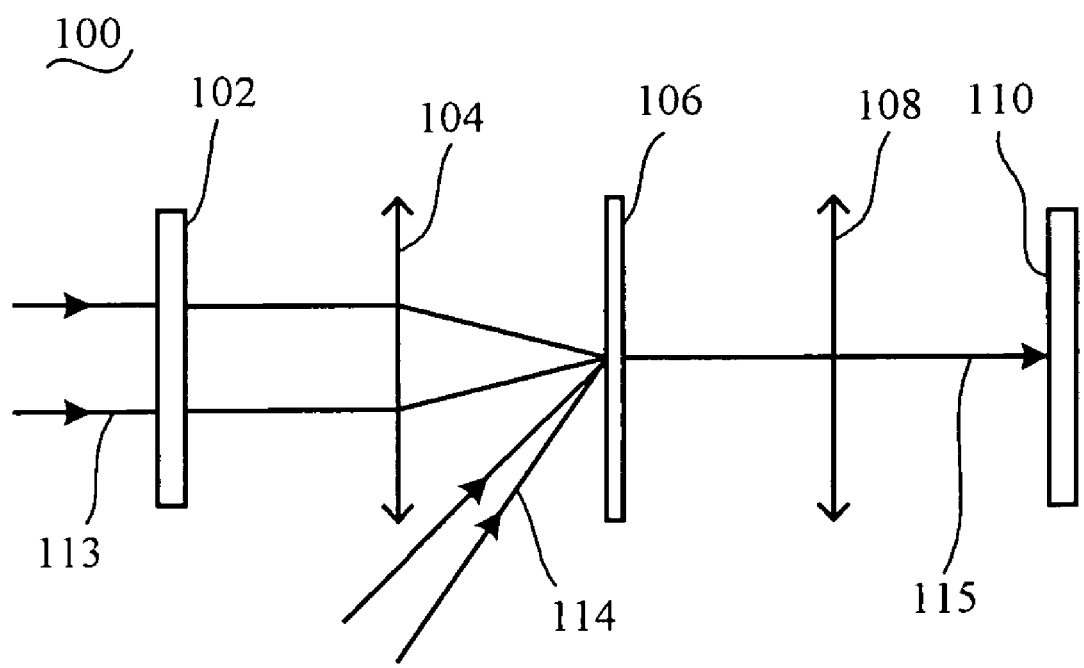
FIG. 37 is a schematic, cross-sectional view of a holographic storage system in accordance with a preferred embodiment of the present invention, showing essential optical paths thereof.

Referring to FIG. 37, this is a schematic, cross-sectional view of a holographic storage system 100 for data recording and retrieval in accordance with a preferred embodiment of the present invention, showing essential optical paths thereof. The holographic storage system 100 includes a front group Fourier transform lens system 104 and a rear group Fourier transform lens system 108 arranged on a common optical axis (not shown). A holographic storage medium 106 in the form of a holographic disk, a holographic tape, or bulk holographic material (e.g., a crystal), etc., is disposed between the front group Fourier transform lens system 104 and the rear group Fourier transform lens system 108. Generally, the holographic storage medium 106 is placed in a rear focal plane (not shown) of the front group Fourier transform lens system 104 and a front focal plane (not shown) of the rear group Fourier transform lens system 108 at the same time. An encoding device 102 is configured in a front focal plane (not shown) of the front group Fourier transform lens system 104. The encoding device 102 is configured for encoding data into the signal beam 113 by setting its object pixels (not shown) to transmit or reflect the signal beam 113. The encoding device 102 is usually centered on the optical axis, and can be a spatial light modulator (SLM). A sensor 110, e.g., a CCD (charge coupled device) or a CMOS (complementary metal oxide semiconductor) active pixel array device, is usually placed in the rear focal plane (not shown) of the rear group Fourier transform lens system 108. The sensor 110 has a number of image pixels (not shown) corresponding to the object pixels, and is usually attached to a decoder (not shown), which is capable of decoding data received from the sensor 110.

system 108, with the exact relationship usually being determined by the sizes of object pixels and the image pixels. The front group Fourier transform lens system 104 can be the positive optical path lens arrangement of the Fourier transform lens system of the first embodiment, the second embodiment, the third embodiment, or the fourth embodiment as described above. The rear group Fourier transform lens system 108 can be the reverse optical path lens arrangement of the Fourier transform lens system of the first embodiment, the second embodiment, the third embodiment, or the fourth embodiment as described above. In one example, the front group Fourier transform lens system 104 is the positive optical path lens arrangement of the Fourier transform lens system 20 of the second embodiment, and the rear group Fourier transform lens system 108 is the reverse optical path lens arrangement of the Fourier transform lens system 10 of the first embodiment. In another example, the front group Fourier transform lens system 104 is the positive optical path lens arrangement of the Fourier transform lens system 40 of the fourth embodiment, and the rear group Fourier transform lens system 108 is the reverse optical path lens arrangement of the Fourier transform lens system 30 of the third embodiment.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A Fourier transform lens system, comprising:
a first lens group having negative power, wherein the first lens group comprises two negative meniscus lenses each having negative power, and each of the negative meniscus lenses has a concave lens surface facing toward a concave lens surface of the other negative meniscus lens; and
a second lens group having positive power disposed at a first side of the first lens group with the first lens group and the second lens group being arranged on a common optical axis, wherein the second lens group comprises a positive lens having a convex lens surface facing toward the first lens group;
and wherein the Fourier transform lens system satisfies the following conditions (1)~(3):

$$0.1 < R_{1R}/f < 0.4; \quad (1)$$

$$-0.4 < R_{2F}/f < -0.1; \text{ and} \quad (2)$$

$$0.1 < d_{12}/f < 0.3; \quad (3)$$

where, f is a total focal length of the Fourier transform lens system; $R_{1R}$ and $R_{2F}$ are radiuses of curvature of the concave lens surfaces of the two negative meniscus lenses respectively; and $d_{12}$ is an air space between the two negative meniscus lenses along a direction of the optical axis.

2. The Fourier transform lens system of claim 1, wherein the Fourier transform lens system further satisfies the following conditions (4)~(5):

$$n_{20} > 1.7; \text{ and} \quad (4)$$

$$n_{20} - n_{10} > 0.15; \quad (5)$$

where, $n_{20}$ is a refractive index of a material of the second lens group; and $n_{10}$ is a refractive index of a material of one of the negative meniscus lenses that is adjacent to the second lens group.

3. The Fourier transform lens system of claim 2, wherein the Fourier transform lens system further satisfies the following condition (6):

$$0.55 < f_2/f < 0.9; \quad (6)$$

where, $f_2$ is a focal length of the second lens group.

4. The Fourier transform lens system of claim 1, wherein the positive lens is a bi-convex lens.

5. The Fourier transform lens system of claim 1, further comprising a third lens group having positive power, wherein the third lens group is disposed at a second side of the first lens group opposite to the first side of the first lens group.

6. The Fourier transform lens system of claim 5, wherein the third lens group comprises a positive meniscus lens having positive power, and the positive meniscus lens has a convex lens surface facing away from the first lens group.

7. A holographic storage system, comprising:
an encoding device having object pixels;
a holographic storage medium positioned on an optical axis of the holographic storage system;
a sensor having image pixels corresponding to the object pixels;
a front group Fourier transform lens system configured for guiding a signal beam encoded by the encoding device to the holographic storage medium whereat the signal beam intersects with a reference beam to write a hologram; and
a rear group Fourier transform lens system having a lens arrangement essentially reverse to that of the front group Fourier transform lens system, the rear group Fourier transform lens system being configured for guiding a reconstructed signal beam to the sensor, the reconstructed signal beam produced by the hologram upon illumination thereof with the reference beam;
wherein each of the Fourier transform lens systems comprises:
a first lens group having negative power, wherein the first lens group comprises two negative meniscus lenses each having negative power, and each of the negative meniscus lenses has a concave lens surface facing toward a concave lens surface of the other negative meniscus lens; and
a second lens group having positive power disposed at a first side of the first lens group with the first lens group and the second lens group being arranged on the optical axis, wherein the second lens group comprises a positive lens having a convex lens surface facing toward the first lens group;
and wherein each of the Fourier transform lens systems satisfies the following conditions (1)~(3):

$$0.1 < R_{1R}/f < 0.4; \quad (1)$$

$$-0.4 < R_{2F}/f < -0.1; \text{ and} \quad (2)$$

$$0.1 < d_{12}/f < 0.3; \quad (3)$$

where, f is a total focal length of the Fourier transform lens system; $R_{1R}$ and $R_{2F}$ are radiuses of curvature of the concave lens surfaces of the two negative meniscus lenses respectively; and $d_{12}$ is an air space between the two negative meniscus lenses along a direction of the optical axis.

8. The holographic storage system of claim 7, wherein each of the Fourier transform lens systems further satisfies the following conditions (4)~(5):

$$n_{20} > 1.7; \text{ and} \quad (4)$$

$$n_{20} - n_{10} > 0.15; \quad (5)$$

where, $n_{20}$ is a refractive index of a material of the second lens group; and $n_{10}$ is a refractive index of a material of one of the negative meniscus lenses that is adjacent to the second lens group.

9. The holographic storage system of claim 8, wherein each of the Fourier transform lens systems further satisfies the following condition (6):

$$0.55 < f_2/f < 0.9; \quad (6)$$

where, $f_2$ is a focal length of the second lens group.

10. The holographic storage system of claim 7, wherein each of the Fourier transform lens systems further comprises a third lens group having positive power, wherein the third lens group is disposed at a second side of the first lens group opposite to the first side of the first lens group.

11. The holographic storage system of claim 10, wherein the third lens group comprises a positive meniscus lens having positive power, and the positive meniscus lens has a convex lens surface facing away from the first lens group.

12. The holographic storage system of claim 7, wherein the decoding device is a spatial light modulator.

13. The holographic storage system of claim 7, wherein the holographic storage medium is selected from the group consisting of a holographic disk, a holographic tape, and bulk holographic material.

14. The holographic storage system of claim 7, wherein the sensor is selected from the group of devices consisting of charge coupled devices, and complementary metal oxide semiconductor active pixel array devices.

15. A holographic assembly comprising:

an encoding device;

a holographic storage medium positioned on an optical axis of the holographic assembly; and a Fourier transform lens system configured for guiding a signal beam encoded by the encoding device to the holographic storage medium whereat the signal beam intersects with a reference beam to write a hologram;

wherein the Fourier transform lens system comprises:

a first lens group having negative power, wherein the first lens group comprises two negative meniscus lenses each having negative power, and each of the negative meniscus lenses has a concave lens surface facing toward a concave lens surface of the other negative meniscus lens; and a second lens group having positive power disposed at a first side of the first lens group with the first lens group and the second lens group being arranged on the optical axis, wherein the second lens group comprises a positive lens having a convex lens surface facing toward the first lens group;

and wherein the Fourier transform lens system satisfies the following conditions (1)~(3):

$$0.1 < R_{1R}/f < 0.4; \tag{1}$$

$$-0.4 < R_{2F}/f < -0.1; \text{ and} \tag{2}$$

$$0.1 < d_{12}/f < 0.3; \tag{3}$$

where, f is a total focal length of the Fourier transform lens system; $R_{1R}$ and $R_{2F}$ are radiuses of curvature of the concave lens surfaces of the two negative meniscus lenses respectively; and $d_{12}$ is an air space between the two negative meniscus lenses along a direction of the optical axis.

16. The holographic assembly of claim 15, wherein the Fourier transform lens system further satisfies the following conditions (4)~(5):

$$n_{20} > 1.7; \text{ and} \tag{4}$$

$$n_{20} - n_{10} > 0.15; \tag{5}$$

where, $n_{20}$ is a refractive index of a material of the second lens group; and $n_{10}$ is a refractive index of a material of one of the negative meniscus lenses that is adjacent to the second lens group.

17. The holographic assembly of claim 16, wherein the Fourier transform lens system further satisfies the following condition (6):

$$0.55 < f_2/f < 0.9; \tag{6}$$

where, $f_2$ is a focal length of the second lens group.

18. A holographic assembly comprising:

a holographic storage medium positioned on an optical axis of the holographic assembly;

a sensor; and a Fourier transform lens system configured for guiding a reconstructed signal beam to the sensor, the reconstructed signal beam being produced by illumination of a hologram stored in the holographic storage medium with a reference beam;

wherein the Fourier transform lens system comprises:

a first lens group having negative power, wherein the first lens group comprises two negative meniscus lenses each having negative power, and each of the negative meniscus lenses has a concave lens surface facing toward a concave lens surface of the other negative meniscus lens; and a second lens group having positive power disposed at a first side of the first lens group with the first lens group and the second lens group being arranged on the optical axis, wherein the second lens group comprises a positive lens having a convex lens surface facing toward the first lens group;

and wherein the Fourier transform lens system satisfies the following conditions (1)~(3):

$$0.1 < R_{1R}/f < 0.4; \tag{1}$$

$$-0.4 < R_{2F}/f < -0.1; \text{ and} \tag{2}$$

$$0.1 < d_{12}/f < 0.3; \tag{3}$$

where, f is a total focal length of the Fourier transform lens system; $R_{1R}$ and $R_{2F}$ are radiuses of curvature of the concave lens surfaces of the two negative meniscus lenses respectively; and $d_{12}$ is an air space between the two negative meniscus lenses along a direction of the optical axis.

19. The holographic assembly of claim 18, wherein the Fourier transform lens system further satisfies the following conditions (4)~(5):

$$n_{20} > 1.7; \text{ and} \tag{4}$$

$$n_{20} - n_{10} > 0.15; \tag{5}$$

where, $n_{20}$ is a refractive index of a material of the second lens group; and $n_{10}$ is a refractive index of a material of one of the meniscus lenses that is adjacent to the second lens group.

20. The holographic assembly of claim 19, wherein the Fourier transform lens system further satisfies the following condition (6):

$$0.55 < f_2/f < 0.9; \tag{6}$$

where, $f_2$ is a focal length of the second lens group.

* * * * *